United States Patent

Strauss et al.

[15] 3,675,307
[45] July 11, 1972

[54] SOLDERING FLUXES

[72] Inventors: Rudolf Siegfried Strauss; Peter David Teitz, both of London, England

[73] Assignee: Fry's Metals Limited, London, England

[22] Filed: Aug. 8, 1969

[21] Appl. No.: 848,701

[52] U.S. Cl. ....................................... 29/495, 148/23
[51] Int. Cl. ............................... B23k 31/02, B23k 35/36
[58] Field of Search ............................. 148/23; 29/495

[56] References Cited

UNITED STATES PATENTS

| | | | |
|---|---|---|---|
| 1,949,916 | 3/1934 | McQuaid | 148/23 |
| 2,772,192 | 11/1956 | Wobbe et al | 148/23 |
| 2,756,497 | 7/1956 | Gole | 148/23 X |
| 2,801,196 | 7/1957 | Doerr | 148/23 |
| 2,816,357 | 12/1957 | Henning | 29/495 |
| 2,978,369 | 4/1961 | Bottle et al. | 148/23 |
| 3,035,339 | 5/1962 | Motter et al. | 29/495 |
| 3,099,590 | 7/1963 | Laudenslager, Jr. | 148/23 |
| 3,436,278 | 4/1969 | Poliak | 29/495 X |

OTHER PUBLICATIONS

Soldering Manual, American Welding Society publication, 1959, pp. 24–37

Manko, Howard H., " How to Choose The Right Solder Flux," Product Engineering, June 13, 1960, pp. 43–50.

Primary Examiner—John F. Campbell
Assistant Examiner—Ronald J. Shore
Attorney—Watson, Cole, Grindle & Watson

[57] ABSTRACT

A method of soldering or tinning in which the flux used consists of or contains a hydrohalide, other than a hydroiodide, of a monobasic amino acid or of an ester of such acid with an alcohol containing 1 to 10 carbon atoms.

11 Claims, No Drawings

SOLDERING FLUXES

The present invention provides soldering and tinning fluxes based on monobasic amino acids or esters of such acids with straight or branched chain alcohols containing one to 10 carbon atoms, which we have found to combine good fluxing power on copper and its alloys, tinplate, and steel with a relatively low corrosive action of the flux residue which is left after soldering.

The soldering flux according to the invention consists of or contains a hydrohalide (other than a hydroiodide) of a monobasic amino acid. The hydrohalide is preferably hydrobromide. The flux may contain a mixture of two or more such hydrohalides of monobasic amino acids or a halide of a substance which contains a significant proportion of one or more monobasic amino acids such as a protein concentrate derived from hydrocarbon oils, or a fish or animal protein concentrate. Preferably the amino acid contains not more than twelve carbon atoms.

If desired, the hydrohalide of the monobasic amino acid may be replaced, wholly or in part, by a hydrohalide of an ester of such an acid with an alcohol, straight or branched chain, containing one to 10 carbon atoms.

Specific examples of suitable flux constituents are the hydrochlorides and hydrobromides of α-amino butyric acid, α-γ-diamino butyric acid, leucine, isoleucine, valine, glycine, α-alanine, β-alanine, phenyl alanine, serine and lysine.

The active material, i.e. the hydrohalide of a monobasic amino acid or its ester, may be used, as such, as the flux, e.g. in pure crystalline form; in solution in a suitable solvent, e.g. water, an alcohol, a mixture of water and an alcohol, gylcerine, ethylene glycol or polyethylene glycol; in solution or dispersed in a suitable solid or semi-solid medium such as polyethylene glycol of high molecular weight or rosin; or emulsified as an aqueous solution in mineral oil, a grease or a wax. If desired suitable wetting agents or thickeners may be included in the flux when it is formulated as a solution or dispersion.

The active material may also be utilized in the form of a thickened solution or of a suspension as the flux portion of solder cream, by which is meant a suspension of finely powdered solder in the flux. It may also be used, in solid form or as a solution or dispersion in a suitable carrier, as a flux core in a solder wire, or as a flux coating on solder wire, solder foil or tape, a solder pre-form or solder power.

When the flux is an aqueous solution of the active material and is intended for use in oven-soldering operations it is desirable to include in the flux polyethylene glycol having a molecular weight of 200 –1000. Preferably the polyethylene glycol is present in an amount of one quarter to twice the weight of the hydrohalide of a monobasic amino acid or its ester.

When the flux is to be used with higher melting grades of soft-solder or for prolonged stoving in oven-soldering operations, it may contain a substituted ammonium halide, other than an iodide, such for example as isopropylamine hydrobromide or ethylamine hydrobromide. The substituted ammonium halide is preferably present in an amount of quarter to twice the weight of the hydrohalide of a monobasic amino acid or its ester.

When the flux is an aqueous solution a substituted ammonium halide may be incorporated in addition to polyethylene glycol.

Fluxes according to the invention may be applied as a precoating to a metal surface, e.g. of copper, copper alloy or mild steel, which is subsequently to be soldered or tinned. In this case the flux is best applied to the metal surface as a solution in a volatile solvent. A typical example of such solution is a 5 –25 % w/vol solution of valine hydrobromide in isopropyl alcohol. Application of the coating solution may be carried out by dipping, brushing, roller coating, spraying or any other suitable method. After application the coating is dried in air, preferably warm air. Metal surfaces so pre-coated can be soldered or tinned without further application of flux.

When the flux is an aqueous solution it is desirable, as is well known, to include in the solution a wetting agent in an amount of up to 1% w/vol (i.e. gms per 100 cc) to improve penetration of the flux into the joint to be soldered. Any convenient wetting agent can be used for the purpose, for example the long chain sulphonic acid sold under the Registered Trade Mark "Teepol."

The following are typical examples of fluxes for use in accordance with the invention:

a. Examples of hydrochlorides and hydrofluorides of monobasic amino acids.
  i. A 5% w/vol. solution of valine hydrofluoride in water
  ii. A 5% w/vol. solution of alanine hydrofluoride in water
  iii. A 10% w/vol. solution of lysine hydrochloride in water
  iv. A 10% w/vol. solution of valine hydrochloride in water
  v. A 5% w/vol. solution of alanine hydrochloride in water
  vi. A 10% w/vol. solution of phenylalanine hydrofluoride in water
  vii. A 10% w/vol. solution of leucine hydrochloride in water b. Hydrobromides of monobasic amino acids.
  i. A 10% w/vol. solution of valine hydrobromide in water
  ii. A 10% w/vol. solution of valine hydrobromide in isopropyl alcohol
  iii. A 10% w/vol. solution of valine hydrobromide in equal volumes of water and isopropyl alcohol
  iv. A 10% w/vol. solution of β-alanine hydrobromide in water
  v. A 10% w/vol. solution of α-alanine hydrobromide in equal volumes of water and isopropyl alcohol.

c. Hydrohalide esters of monobasic amino acids.
  i. Hydrobromide of alanine ethyl ester
  ii. Hydrobromide of alanine propyl ester
  iii. Hydrobromide of alanine iso-octyl ester
  iv. Hydrobromide of valine ethyl ester
  v. Hydrobromide of valine propyl ester
  vi. Hydrobromide of valine iso-octyl ester used as such or as a 5–20% w/vol. solution in water or in isopropyl alcohol.

d. Fluxes containing polyethylene glycol and/or a substituted ammonium halide.
  i. An aqueous solution containing 5% w/vol. β-alanine hydrobromide and 3% w/vol. polyethylene glycol of molecular weight 200.
  ii. An aqueous solution containing 5% w/vol. of valine hydrobromide and 3% w/vol. isopropylamine hydrobromide.
  (iii. AN aqueous solution containing 5% w/vol. β-alanine hydrobromide and 5% w/vol. isopropylamine hydrochloride.
  (iv. An aqueous solution containing 5% w/vol. β-alanine hydrobromide and 5% w/vol. ethylamine hydrobromide.
  (v. An aqueous solution containing 5% w/vol. β-analine hydrobromide, 5% w/vol. ethylamine hydrobromide and 5% w/vol. polyethylene glycol of molecular weight 200.

When a component, such for example as a motor car radiator, is soldered in an oven flux and solder are applied to the joints to be soldered before introduction of the components into the oven. It is necessary that the flux should have a sufficiently long life to ensure that it will not have evaporated and will remain active when the component has attained within the oven a temperature sufficient to melt the solder.

Fluxes for use in accordance with the invention have been tested as follows to determine the life of the flux:

Two drops of the flux, as an aqueous solution, are placed on a piece of copper sheet measuring 1½× 1½inch and of thickness 0.01 which is then heated to 120° C to drive off all or most of the water. The piece of copper is then floated on a bath of solder maintained at a temperature of 390° C for a trial time of 30 secs., after which a pellet of solder, consisting of 60 percent by weight tin and 40 percent by weight lead and weighing 0.12 gms., is applied to the copper. If the solder spreads as it melts the flux has remained active. The test is continued with progressive increase in the trial time until it is found that the flux is no longer active. The high temperature life of the flux is the maximum time lapse after which the solder will still spread and wet the copper surface.

The following are the high temperature lives of certain of the above-described fluxes as determined by this test:

| Flux | High Temp. Life |
|---|---|
| 1). 10% w/vol solution of β-alanine hydrobromide in water | 45 seconds |
| 2). Aqueous solution containing 5% w/vol β-alanine hydrobromide and 5% w/vol ethylamine hydrobromide | 90 seconds |
| 3). Aqueous solution containing 5% w/vol β-alanine hydrobromide and 5% w/vol isopropylamine hydrobromide | 120 seconds |
| 4). Aqueous solution containing 5% w/vol β-alanine hydrobromide and 5% w/vol isopropylamine hydrochloride | 180 seconds |
| 5). Aqueous solution containing 5% w/vol β-alanine hydrobromide, 5% w/vol ethylamine hydrobromide and 5% w/vol polyethylene glycol of molecular weight 200 | 120 seconds |
| 6). Aqueous solution containing 5% w/vol valine hydrobromide, 5% w/vol isopropylamine hydrobromide and 5% w/vol polyethylene glycol of molecular weight 200 | 120 seconds |

What we claim as our invention and desire to secure by Letters Patent is:

1. In a method of soldering or tinning a metal workpiece comprising depositing a quantity of molten solder on a surface of the workpiece and applying a flux to said surface to promote spreading of the solder and bonding thereof to the surface, the improvement of said process comprising utilizing in said flux applying step a flux selected from the group consisting of hydrobromides of valine, $\alpha$-alanine and $\beta$-alanine.

2. A method as claimed in claim 1, in which the flux consists of the pure crystalline hydrobromide.

3. A method as claimed in claim 1, in which the flux is a solution of the hydrobromide.

4. A method as claimed in claim 1, in which the flux is a dispersion of the hydrobromide.

5. A method as claimed in claim 1, in which the flux is an aqueous solution of the hydrobromide which also contains polyethylene glycol having a molecular weight of 200-1000.

6. A method as claimed in claim 5, in which the polyethylene glycol is present in an amount of one quarter to twice the weight of the hydrobromide.

7. A method as claimed in claim 1, in which the flux contains a substituted ammonium halide selected from the group consisting of isopropylamine hydrobromide and ethyl amine hydrobromide.

8. A method as claimed in claim 7, in which the substituted ammonium halide is present in an amount of one quarter to twice times the weight of the hydrobromide.

9. A method as claimed in claim 1, in which the flux is applied as a pre-coating to said metal surface and then dried.

10. A method as claimed in claim 9, in which the flux is applied to the metal surface as a solution of the hydrobromide in a volatile solvent.

11. A method as claimed in claim 10, in which the solution is a 5-25% w/vol. solution of valine hydrobromide in isopropyl alcohol.

* * * * *